Jan. 16, 1962     I. JEPSON     3,017,492
ELECTRIC HEATING DEVICE AND METHOD OF MAKING THE SAME
Filed March 25, 1958     5 Sheets-Sheet 1
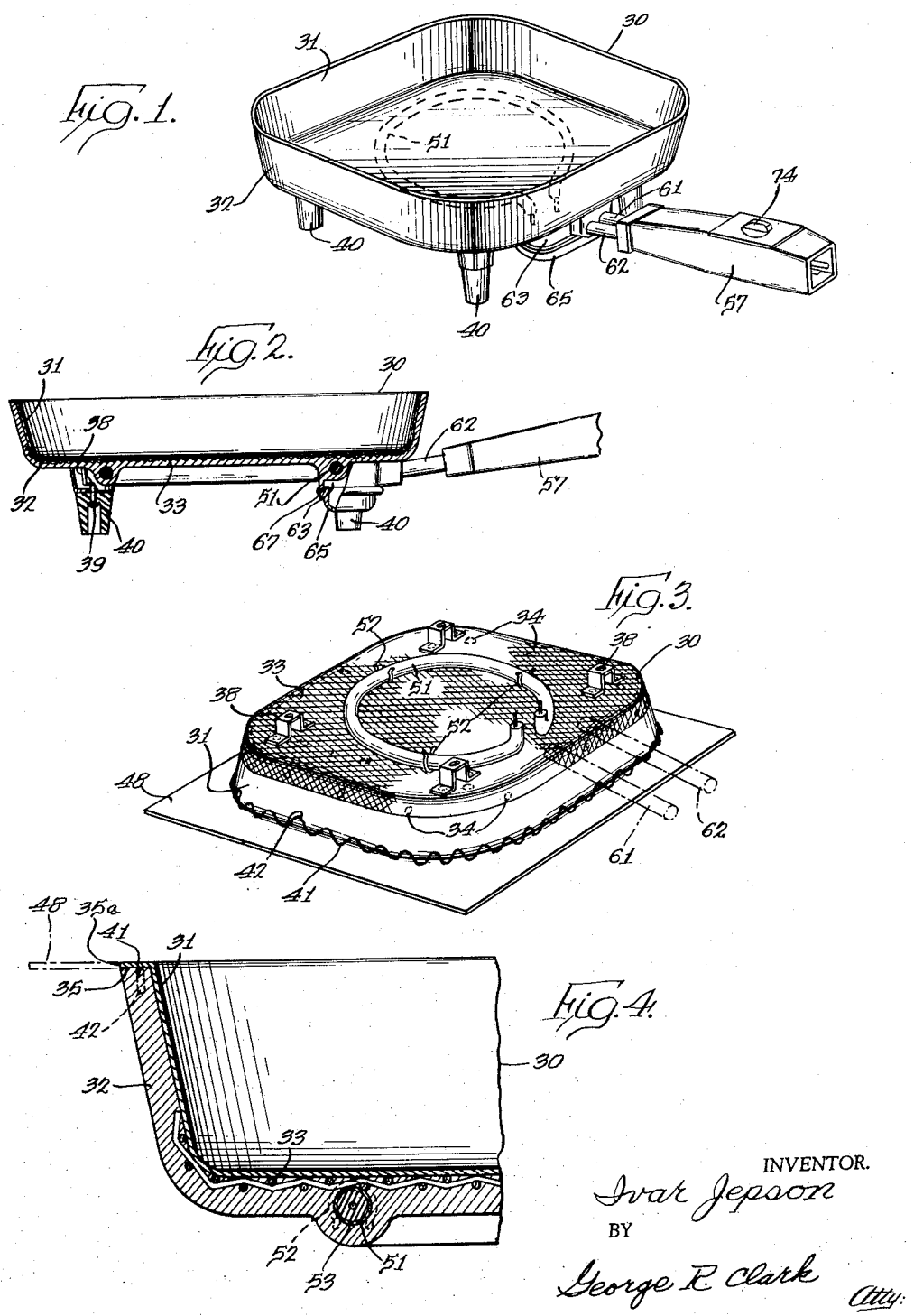
INVENTOR.
Ivar Jepson
BY
George R. Clark
Atty.

Jan. 16, 1962    I. JEPSON    3,017,492
ELECTRIC HEATING DEVICE AND METHOD OF MAKING THE SAME
Filed March 25, 1958    5 Sheets-Sheet 2
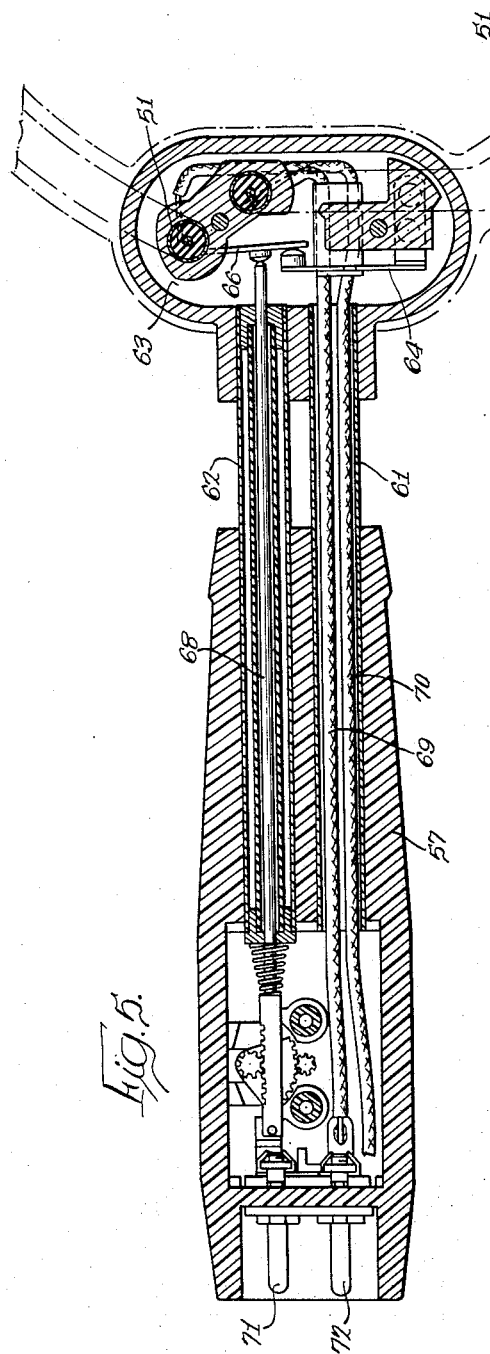
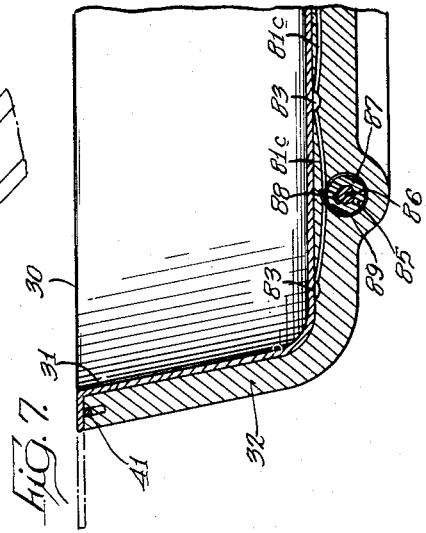
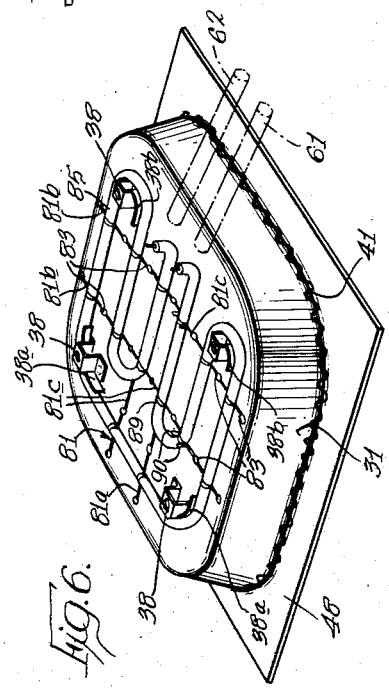
INVENTOR.
Ivar Jepson
BY
George R. Clark
Atty.

Jan. 16, 1962 I. JEPSON 3,017,492
ELECTRIC HEATING DEVICE AND METHOD OF MAKING THE SAME
Filed March 25, 1958 5 Sheets-Sheet 3
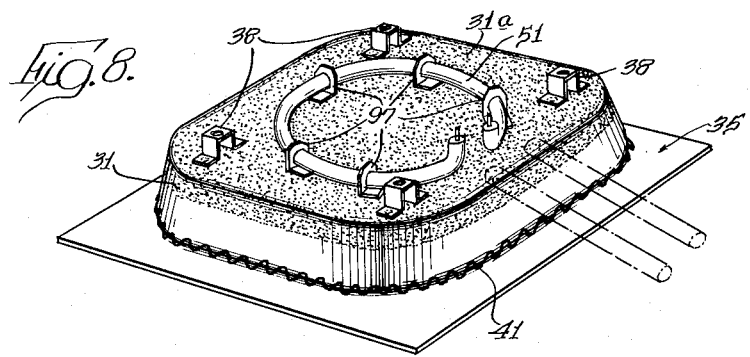
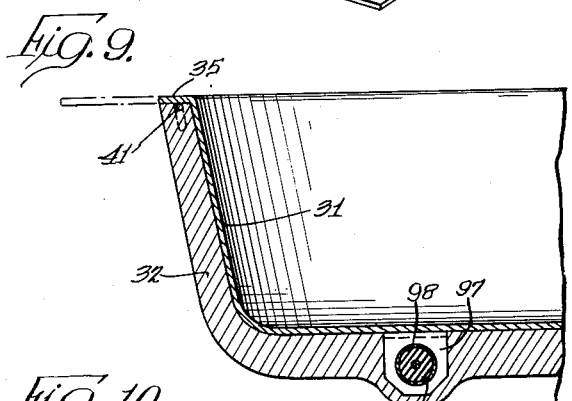
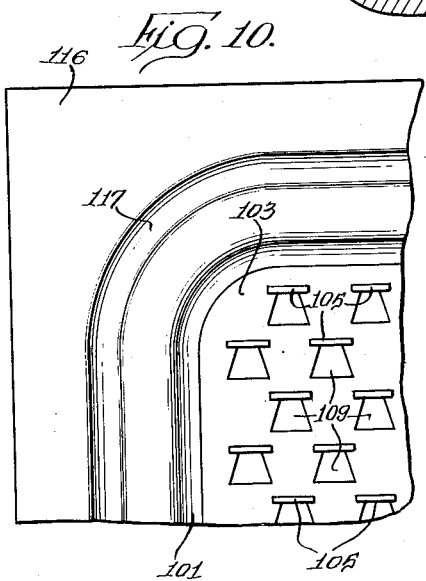
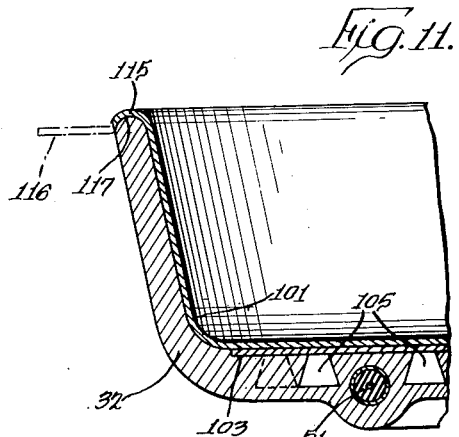
INVENTOR.
Ivar Jepson
BY
George R. Clark
Atty.

Jan. 16, 1962     I. JEPSON     3,017,492
ELECTRIC HEATING DEVICE AND METHOD OF MAKING THE SAME
Filed March 25, 1958     5 Sheets-Sheet 4
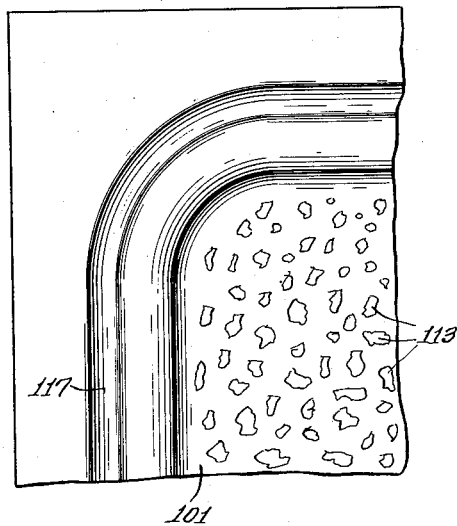
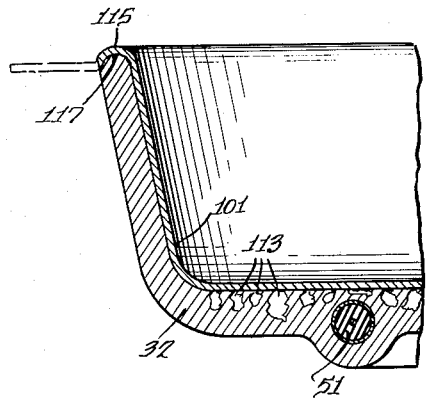
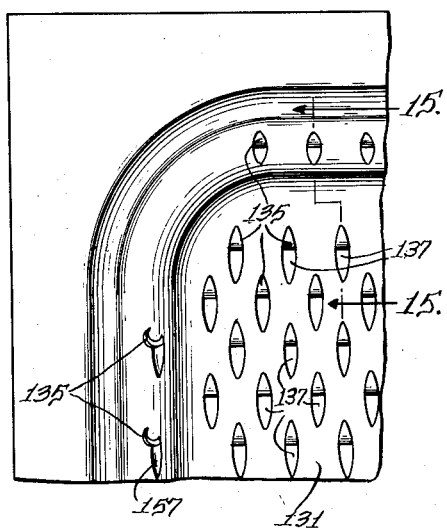
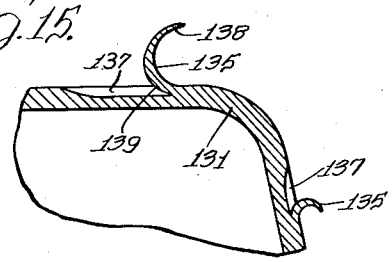
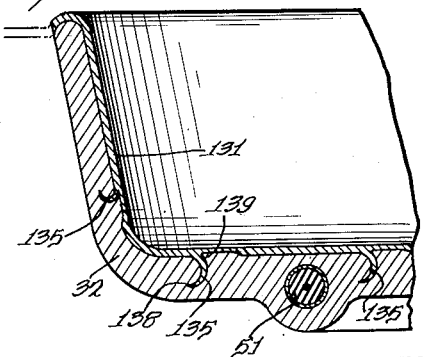
INVENTOR.
Ivar Jepson
BY
George R. Clark
Atty.

Jan. 16, 1962     I. JEPSON     3,017,492
ELECTRIC HEATING DEVICE AND METHOD OF MAKING THE SAME
Filed March 25, 1958     5 Sheets-Sheet 5
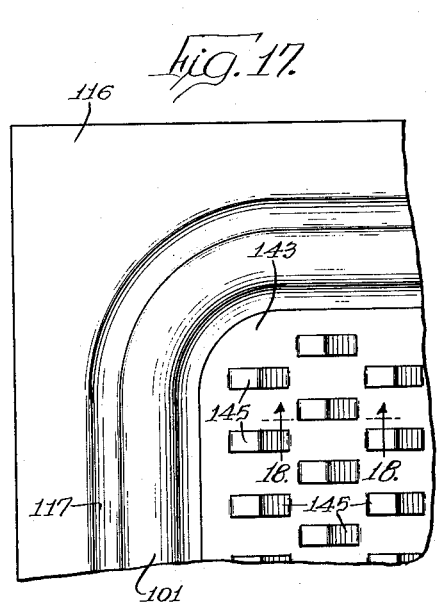
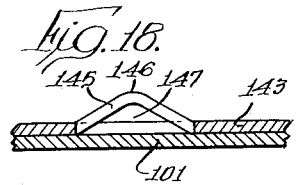
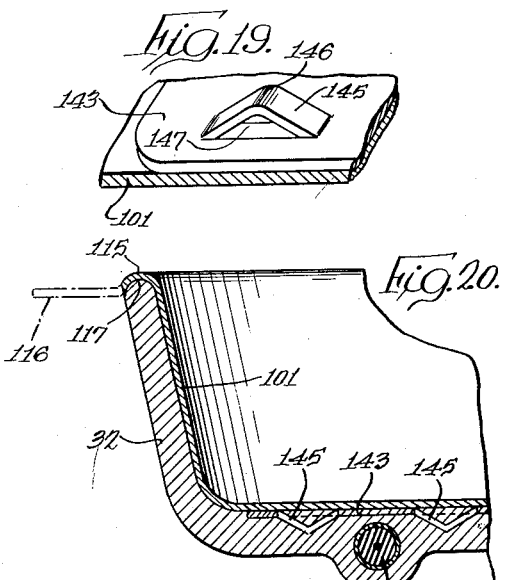
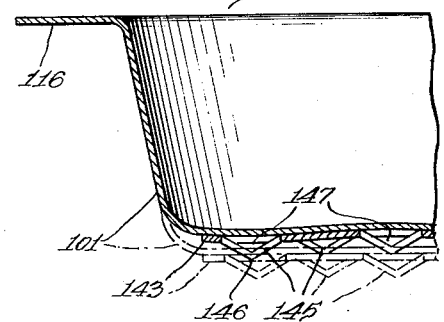
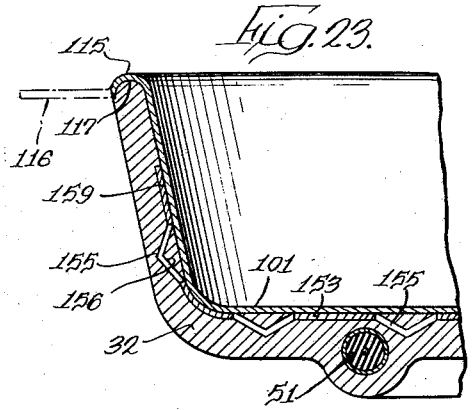
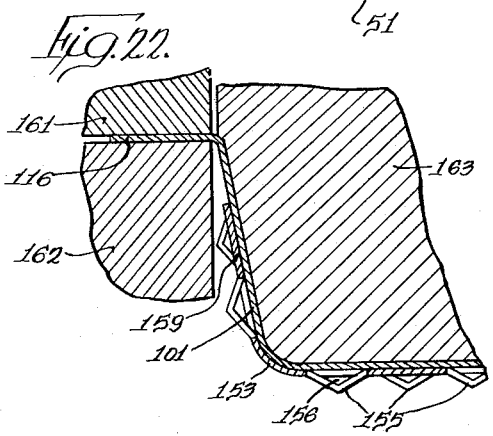
INVENTOR.
Ivar Jepson
BY
George R. Clark
Atty.

United States Patent Office 3,017,492
Patented Jan. 16, 1962

3,017,492
ELECTRIC HEATING DEVICE AND METHOD OF MAKING THE SAME
Ivar Jepson, Oak Park, Ill., assignor to Sunbeam Corporation, Chicago, Ill., a corporation of Illinois
Filed Mar. 25, 1958, Ser. No. 723,877
3 Claims. (Cl. 219—44)

This invention relates to electrically heated devices and method of making the same, and more particularly to cooking vessels such as electric frying pans and methods of making the same.

Several years ago an entirely new electrical appliance was introduced on the market and has since revolutionized home cooking methods and procedures. This appliance is the water immersible electric frying pan. By fabricating the frying pan having a self-contained heating element and thermostatic controls therefor which are sealed against the entrance of moisture, it has become possible to take advantage of efficiencies in heating and the accurate temperature control available in the thermostatically controlled unit while at the same time presenting no greater washing problem than the conventional skillet.

The electric frying pan disclosed and claimed in Jepson Patent 2,744,995 and extensively sold during the last few years is an example of this type of frying pan. It includes a line type resistance heating element embedded in the bottom of a container of cast aluminum, which is polished inside after the casting. Since aluminum is an excellent heat conductor, uniform temperatures are obtained over the entire frying surface of the pan even though the heating element extends through only portions of the bottom of the pan.

Cast aluminum provides a very good heating structure. However, it would be desirable to provide at the surface of the pan a harder material than aluminum. Stainless steel is harder and more scratch resistant than aluminum. Stainless steel, however, is not only a very hard and difficult material to work, but, in addition, it is not a sufficiently good heat conductor and does not distribute the heat from a line type resistance heating element uniformly to all portions of the pan bottom. A composite frypan having a stainless steel inner liner and an aluminum backing layer forms an ideal structure. The stainless steel liner is dense, non-porous and scratch resistant, and the aluminum backing layer serves to distribute heat from the line type heater uniformly over the liner. However, it is necessary for good heat transfer that the aluminum be firmly bonded to the stainless steel. Aluminum has a much higher thermal coefficient of expansion than stainless steel and, on repeated heating and cooling, what is initially a very good bond between the liner and the backing layer can become weakened. It has been difficult and expensive to obtain a lasting intimate bond between the thinner stainless steel pan and the thick aluminum layer cast on the bottom thereof. One solution to the problem of obtaining a bond between a metal of high heat conductivity and a hard metal such as stainless steel comprises securing to one face of such hard metal an anchoring element having anchors projecting therefrom and embedding the anchors in the metal of high heat conductivity as disclosed in my Pat. No. 2,807,700 for "Lightweight Composite Sole Plate and Method of Making Same." The present invention relates in some respects to improvements on bonding stainless steel and aluminum for use in electric heating devices wherein it is desired that the stainless steel facing plate have high heat transfer characteristics.

Although the above-mentioned Jepson Pat. No. 2,807,700 discloses a very satisfactory electrically heated device having a hard metal heating surface such as stainless steel bonded to another metal such as aluminum, it would be desirable to provide an even simpler arrangement.

It is, accordingly, an object of the invention to provide an improved heating device having a hard, dense heating surface and a bottom portion of high heat conductivity material together with an improved method of making the same.

Another object of the invention is to provide an improved electric frying pan having a thin inner shell of stainless steel enclosed in a cast outer shell of aluminum mechanically locked to the inner shell in intimate contact therewith.

Yet another object of the invention is to provide an electric frying pan having a stainless steel inner shell and a steel wire mesh welded or brazed to the bottom thereof with a heavy aluminum layer cast on the mesh and locked thereby to the inner shell.

Still another object of the invention is to provide an electric frying pan including a stainless steel shell having a steel wire frame welded or brazed to the bottom thereof with clamp portions holding a sheathed heating element thereon and looped anchors and a heavy aluminum sheath cast over the heating element and the bottom of the shell in interlocking engagement with the anchors.

Another object of the invention is to provide an electric frying pan having a steel liner to which is secured an anchor sheet having looped projections embedded in an aluminum layer cast over the liner.

Still another object of the invention is to provide an electric frying pan having a steel liner to which an aluminum layer is locked by an anchor plate having dove-tailed projections.

Another object of the invention is to provide a frying pan having metal fragments bonded to a steel liner with an aluminum layer locked to the liner.

Still another object of the invention is to provide a frying pan having a steel liner from which hook-shaped projections are gouged to anchor an aluminum backing layer thereto.

Yet another object of the invention is to provide a method of making unwarped multi-layer frying pans by brazing an anchor sheet on a drawn liner and then drawing the liner to a slightly greater extent.

Further objects of the invention will become apparent from the following detailed description of embodiments of the invention, when read in conjunction with the appended drawings, in which:

FIG. 1 is a perspective view of a frying pan forming one embodiment of the invention;

FIG. 2 is a vertical section of the frying pan shown in FIG. 1, with portions thereof broken away;

FIG. 3 is a perspective view of the frying pan shown in FIG. 1 during one stage of its construction with the pan inverted;

FIG. 4 is an enlarged, fragmentary view of a portion of FIG. 2;

FIG. 5 is an enlarged horizontal section of the handle of the frying pan of FIG. 1;

FIG. 6 is a perspective view similar to FIG. 3 of an alternate embodiment of the invention;

FIG. 7 is an enlarged, fragmentary view similar to FIG. 4 of the embodiment of FIG. 6 at a subsequent stage of its construction;

FIG. 8 is a perspective view similar to FIG. 3 of still another embodiment of the invention at one stage of its construction;

FIG. 9 is an enlarged, fragmentary vertical section similar to FIG. 4 of the frying pan shown in FIG. 8;

FIG. 10 is a fragmentary, bottom plan view of a frying pan forming another embodiment of the invention at one stage of its construction;

FIG. 11 is an enlarged, fragmentary, vertical section similar to FIG. 4 of the frying pan of the embodiment of FIG. 10 at a subsequent stage of its construction;

FIG. 12 is a fragmentary, bottom plan view similar to FIG. 10 of a frying pan forming another embodiment of the invention at one stage of its construction;

FIG. 13 is an enlarged, fragmentary, vertical section similar to FIG. 4 of the frying pan of the embodiment of FIG. 12 at a subsequent stage of its construction;

FIG. 14 is a fragmentary, bottom plan view similar to FIG. 10 of a frying pan forming another embodiment of the invention at one stage of its construction;

FIG. 15 is an enlarged fragmentary, vertical section of the frying pan shown in FIG. 14 and taken along line 15—15 of FIG. 14;

FIG. 16 is an enlarged, fragmentary, vertical section similar to FIG. 4 of the frying pan shown in FIG. 14 at a subsequent stage of its construction;

FIG. 17 is a bottom plan view similar to FIG. 10 of a frying pan forming one embodiment of the invention during one stage of its manufacture;

FIG. 18 is an enlarged, fragmentary, vertical section of a portion of the pan shown in FIG. 17;

FIG. 19 is an enlarged, fragmentary, perspective view of the pan shown in FIG. 18;

FIG. 20 is an enlarged, fragmentary, vertical section similar to FIG. 4 of the pan shown in FIG. 17;

FIG. 21 is an enlarged, fragmentary, vertical section of the pan shown in FIG. 17 but at an intermediate stage in its manufacture;

FIG. 22 is a fragmentary, vertical section of a frying pan forming another embodiment of the invention during a drawing operation in the manufacture thereof; and FIG. 23 is a fragmentary, vertical section of the pan shown in FIG. 22 at a later stage in its construction.

The present invention provides an electric heating device such as, for example, a frying pan having a hard, scratch resistant liner such as a stainless steel liner bonded securely to a backing layer of a metal of high heat conductivity such as aluminum. In one embodiment of the invention, the aluminum is mechanically bonded to the steel liner by anchoring means such as an anchor sheet secured to the liner and having looped or dove-tailed projections embedded in the aluminum. In other embodiments of the invention cast iron or steel rubble secured to the liner and hooks gouged from the liner act positively to lock the backing layer to the liner. In one embodiment of the invention, the liner is composed of stainless steel, and a coarse woven mesh or screen of steel wire is welded to the liner and embedded in cast aluminum so that the cast aluminum is held in intimate contact with the liner to provide maximum heat flow therebetween. A heating element is enclosed in the aluminum. During use, the heating element heats the aluminum adjacent thereto, and the stainless steel liner, being of low thermal conductivity, forms a barrier preventing the rapid escape of heat from the inside of the pan. This slight insulating effect causes the heat to spread uniformly throughout the aluminum, whereby the liner is heated uniformly over its surface and does not have markedly hotter portions adjacent to the heating element.

In another embodiment of the invention, there is provided a stainless steel liner having welded thereto a steel clip or frame supporting a flexible resistance heating element, and looped portions of the clip are spaced from the liner. A heavy outer body portion of aluminum is cast over the heating element and clip in intimate contact with the liner, with or without previously flame spraying aluminum over the liner, heating element and clip. The looped portions of the clip lock the cast aluminum body portion tightly to the liner as well as holding the heating element in position during the casting operation.

In a method forming one embodiment of the invention, an unwarped pan having a drawn stainless steel liner with an anchor sheet having openings therein brazed to the bottom thereof is formed by drawing the liner to almost the complete depth of the pan, copper-brazing the anchor sheet to the pan and then drawing the pan a small additional amount to eliminate any warping of the pan. The second drawing is so slight that there is a small differential drawing of the portions of the pan adjacent to the openings in the sheet and the upper surface of the pan-shaped liner is smooth. Aluminum then is cast over the exterior portions of the liner and anchor sheet, and interlocks with anchor portions of the anchor sheet to securely hold the aluminum layer to the liner. This method provides a very good adhesion and heat transfer between the aluminum layer and the liner.

*Embodiment shown in FIGS. 1 through 5*

Referring more specifically to the drawings, there is shown in FIG. 1 a frying pan provided with a substantially square vessel portion 30 including a thin inner liner or facing 31 of a hard, non-porous, non-corrosive metal, such as stainless steel. The liner 31 presents an excellent frying and cooking surface. It is inert to and uncorrodable by acids of foods, takes an excellent and durable polish and is highly scratch resistant. However, stainless steel is a metal of relatively low heat conductivity. In order to conduct the heat uniformly over the bottom of the liner 31, there is provided a thick outer shell or backing layer 32 of a metal of high heat conductivity, such as aluminum, for example, which is cast against and around the liner 31. The aluminum backing layer 32 spreads the heat uniformly over the bottom of the pan, and, since the liner is a poorer conductor of heat than the backing layer, the liner enhances the spreading effect of the heat through the backing layer to insure very uniform heat distribution on the cooking surface of the liner. To retain the aluminum layer in good heat conducting relation with the liner 31, the layer 32 and liner 31 are locked in intimate contact therewith by an anchoring layer 33. In the embodiment of FIGS. 1 to 5 a coarse woven grill-like anchor or screen 33 of a strong metal serves as the anchoring layer 33. The screen 33 is spot-welded or brazed to the liner 31 at a number of spaced points 34 while under tension. The screen 33 may be of steel or stainless steel wires woven together and may take the form of a basket fitting closely over the drawn bottom portion of the liner and extending partially up the sides of the liner. The basket is secured to the liner with the wires tensioned. A flange 35 is provided on the liner to form a rim of hard metal for the pan.

To facilitate anchoring the portion of the aluminum layer adjacent the flange 35, there may be provided wires 41 welded to the flange 35. The wires 41 are formed with a continuous series of loops 42 which project away from the flange 35 and are adapted to interlock with the aluminum cast therearound. By using the anchoring wires 41, it is possible to maintain the size of the basket 33 little larger than the bottom of the vessel 30. Otherwise, it would be necessary to extend the turned up edges of basket 33 to the flange 35 in order that the cast aluminum be anchored tightly to the vessel 30.

The screen 33 makes only point contacts with the liner, and during the casting operation, the aluminum flows around the wires into contact with the liner 31 at all points on the outer surface of the liner except at the minute tangential lines or points of contact between the wires and the liner. This arrangement assures good anchoring of the entire mass of aluminum since the screen is so intimately associated with the casting that there is no possibility of its working loose from the aluminum. Hence, excellent heat transfer from the aluminum to the liner is effected. To eliminate the necessity of drilling and tapping the aluminum casting and because of the relatively thin wall thickness of the cast aluminum, leg mounting brackets 38 are welded or brazed to the screen or grill and the liner. The brackets extend through the cast layer and are adapted to receive screws 39 holding legs 40 to the pan. It is contemplated that the aluminum layer 32 may also be built up by flame spraying rather than by casting. In such applications, the brackets 38 are particularly necessary since the wall thickness achieved by flame spraying is so thin that most other methods of leg mounting would not be feasible. When the layer 32 is formed by casting, it may be found to be desirable to employ cast posts or bosses having threaded sockets therein for receiving the leg mounting screws.

In fabricating the vessel 30, the liner 31 is drawn from a sheet of stainless steel to the shape thereof shown in FIGS. 3 and 4, with the flange 35 having an excess portion 48. For reasons to be explained below, the excess flange portion 48 is not trimmed from the flange 35 until after the heat conducting aluminum layer has been cast to the liner 31. To provide optimum bonding condition between the liner 31 and the cast aluminum, the outer surfaces of the liner 31 are roughened by sand blasting or the like prior to the assembly of the anchoring members and leg mounting brackets to the liner. After the liner has been sand blasted, the basket shaped screen 33 is fitted to the bottom of the liner and welded or brazed thereto. Then the anchoring wires 41 are welded or brazed to the flange 35.

To provide a heat source for the vessel 30, a sheathed heating element 51 is cast integrally with the aluminum layer 32 in much the same manner as disclosed in Jepson Pat. No. 2,744,995. The sheathed heating element may be of conventional form having an outer sheath of steel or copper, an inner conductor of coiled resistance wire and an insulating material of good heat conductivity separating the resistance wire from the sheath. Since the liner 31 with the anchoring elements and leg brackets must be placed in the mold to receive the aluminum layer, it is most expedient to secure the heating element to the liner assembly. To accomplish this attachment, a number of U-shaped clips 52 are secured to the liner 31 with the leg portions extending upwardly to receive the sheathed heating element 51 therebetween. This assembly then is placed in a mold with the excess portion 48 of the liner fitting tightly into recesses at the parting line of the mold. The aluminum is then introduced into the mold on the side of the assembly to which the anchoring elements are secured to form the thick layer or shell 32. The method of casting and reason for utilizing the extending portion 48 is fully explained in my Pat. No. 2,807,700 referred to above. In brief, the excess flange portion 48 extends into a recess at the parting line of the mold to prevent the molten aluminum from passing around to the inside of the stainless steel liner 31. Whether the molten aluminum is introduced under pressure or merely by gravity flow, there is a tendency for it to flow to both sides of the sheet positioned in the mold cavity. By having the excess flange portion 48 extending well outside of the mold cavity itself, the possibility of the molten aluminum flowing inside of liner 31 is virtually eliminated. It can be readily appreciated that if the aluminum were deposited on the inside of the liner 31, it would be difficult and costly to remove it from the stainless steel surface. As the aluminum flows into the mold, it flows around and under the wires of the screen 33 and around and under a steel sheath 53 of the element 51, which is spaced away from the liner 31 by the screen 33 and the clips 52 so that a substantial thickness of aluminum is between the sheath 53 and the liner 31, the aluminum being bonded to these elements throughout the areas of contact therebetween.

In order to provide heat insulation between the cooking portion of the frypan and a hollow handle 57, the aluminum is cast around stainless steel tubes 61 and 62, in the same manner as disclosed in my Pat. No. 2,744,995. Also, the handle tubes 61 and 62 may be omitted and a single, larger stainless steel tube of the type disclosed in my Patent 2,744,995 secured in place during the casting operation. The tubes 61 and 62 open into a control chamber 63 in which is mounted a bimetallic thermostat 64 (FIG. 5) in close thermal relationship to the bottom of the pan. Lead wire connections to the ends of the heating element 51 may be made as described below. A cover 65 is sealed by a gasket 67 to the control chamber to make it watertight.

The layer 32 may also be formed by first flame spraying a thin layer of aluminum and then casting a heavy main layer of aluminum, or may be formed completely by flame spraying, in which latter case the tubes 61 and 62 are held in desired positions during the flame spraying. Aluminum flame sprayed against the sand-blasted roughened outer surface of the liner 31 forms a very tenacious bond with the liner. The aluminum so sprayed may be at a temperature substantially higher than the melting point of aluminum and is directed forcibly against the liner to effect an excellent bond therewith. After the layer or shell 32 is cast or flame sprayed, the excess portions 48 of the flange 35 are cut away to provide a smooth lip 35a, and its side surfaces are polished.

Then, in accordance with one specific embodiment of my invention, the bimetallic thermostat 64 (FIG. 5) and a switch member 66 are mounted in the control chamber 63, a conductive control rod 68 is mounted in one of the tubes 61 and 62 and lead wires 69 and 70 are inserted into the other tube. The wire 70 serves to connect a pilot light (not shown) in parallel with the resistance heating element to indicate when current is supplied to the heating element. The handle 57 is mounted on the tubes 61 and 62, and terminal studs 71 and 72 are connected to the rod 68 and the wire 69, after which the cover 65 is bolted to the pan to close the chamber 63 and is sealed by a gasket 67 to the chamber to make it watertight so that the pan may be immersed for cleaning. A manual control knob 74 serves to vary the setting of the rod 68. When the pan comes to the desired temperature during use, the bimetallic thermostat 64 breaks the connection between the member 66 and the rod 68 to interrupt the flow of current to the heating element 51.

In one constructed embodiment of the invention, the liner 31 was composed of stainless steel 0.012 to 0.018 inch in thickness, the aluminum outer shell or layer 32 at the bottom of the vessel 30 was approximately 0.16 of an inch in thickness and the coarse screen 33 was composed of steel wires 0.03 of an inch in diameter having 0.25 inch openings between adjacent wires.

*Embodiment shown in FIGS. 6 and 7*

The frying pan shown in FIGS. 6 and 7 is generally similar to the first embodiment described above, but utilizes a modified form of anchoring element in place of the anchoring screen 33 and a different heating element in place of the heating element 51. A resistance heating element 85 used in the presently described embodiment is highly flexible so that it can be disposed on the bottom of the pan in the close pattern shown in FIG. 6 to provide uniform heat distribution to the cooking surface. The element 85 has a flexible core 86 composed of glass fibers, and a resistance wire 88 of "Nichrome" or similar resistance material is wound into a flexible helix on the core 86. A flexible insulating covering 87 of glass fibers wound around the exterior of the helix of the wire 88 provides an exterior insulating sheath. The anchoring element of the embodiment of FIGS. 6 and 7 comprises a wire clip or harness 81 composed of a plurality of steel wires 81a and 81b welded to the stainless steel liner 31 at points 83 and having looped anchor portions 81c. The wires 81a are each secured at one end to the lefthand wire 81b, as viewed in FIG. 6, and the other end of each wire is welded to the liner 31. The wires 81a and 81b form a unitary assembly with the heating element 85 which is secured to the wires. This assembly may be placed as a unit on the liner 31 and secured thereto by spot welding as described above. The clip 81 serves the dual purpose of holding the element 85 in place during casting of the thick outer shell 32 around the liner 31 and locking the shell to the liner in intimate contact therewith. The wires 82 may be of about 1/32 of an inch in diameter. Threads or wires 89 tie the element 85 to the clip, and the wires may be provided with U-shaped clip portions 90 holding the element 85. Brackets 38 to which legs (not shown) are later secured by screws are welded to the liner, and, during the casting operation, aluminum flows under the brackets and around threaded cores (not shown) positioned in the brackets during casting. The brackets 38 have guide arms 38a and 38b which support the heating element and hold the element away from sharp edges of the brackets. An anchor wire 41 is provided at rim of the liner, and the latter has the flange 48 for keeping casting metal from the interior of the liner as indicated above.

Embodiment shown in FIGS. 8 and 9

In this embodiment of the invention, the layer 32 is anchored to the liner 31 by the relatively stiff, metallically sheathed resistance heating element 51, L-shaped brackets 97 and leg mounting brackets 38. The leg mounting brackets 38 are welded to the liner 31 near its corners and the L-shaped brackets 97 having holes 98 for mounting the sheathed resistance heating element 51 are also welded to the liner. Undulating anchoring wires 41 are welded to flange 35 of the liner, and the aluminum backing or heat conductive layer 32 is cast over the outer side of the liner 31 with screw-like cores (not shown) in the brackets 38. The outer side of the liner is roughened by sand blasting or etching prior to the casting so that a larger, roughened surface 31a is provided thereon to which the aluminum locks in an intimate heat transferring relationship. This roughened surface 31a provides a mechanical interlock between the liner 31 and layer 32. The aluminum layer is anchored securely to liner 31 by the brackets 38, the portions of the element 51 at each side of each bracket 38 and the wires 41. Sheath 53 of the heater 51 is composed of steel and is fairly stiff. The heating element is spaced by the brackets 97 somewhat away from the liner 31 so that the aluminum fills the space therebetween, and the portions of the element 51 near the brackets 97, being stiff, along with the brackets 97 provide excellent anchoring to the layer 32. The brackets 97 positively hold the element 51 and each forms a closed circle around the element 51. Also, since the element 51 is spaced away from the liner 31 and is not in direct contact therewith, the heat from the heating element 51 does not create a line-like hot spot but instead is spread over the bottom portion of the layer 32 to uniformly heat the bottom portion of the liner 31.

Embodiment shown in FIGS. 10 and 11

Another embodiment showing a further variation in the anchoring means for securing a conducting aluminum layer 32 to a stainless steel liner 101 is shown in FIGS. 10 and 11. As shown therein, the cooking vessel includes a stainless steel liner 101 having an aluminum backing layer 32 die cast thereagainst and locked thereto at the bottom by a low carbon steel anchor plate 103. The anchoring between the plate 103 and the cast layer 32 is accomplished by means of trapezoidal or dovetail-shaped anchoring projections 105 punched out of the plate 103 to leave openings 109. The projections 105 extend vertically with respect to the surface of the plate 103. The plate 103 is copper brazed to the liner over the entire face thereof except, of course, for the openings 109. In lieu of the anchor wires 41 used in the earlier embodiments to secure the cast portion to the liner adjacent its rim an overhanging lip or rim 115 forming a groove 117 locks the sides of the layer 32 to the liner. The openings 109 are filled with the aluminum to provide good heat transfer to the liner. An excess flange portion 116 is located at the mold parting line to serve as a seal during the die casting step as was explained in connection with the first embodiment. This flange portion 116 is later removed so that the liner 101 blends with the exterior of the aluminum layer 32. The aluminum layer also encloses a suitable electrically insulated sheathed resistance heater element 51. The plate 103 is substantially coextensive with the bottom of the frying pan, and may be made of steel 0.012 to 0.018 of an inch in thickness with the projections 105 having a height of about 0.19 of an inch and being substantially that wide at the tops thereof, while being about 0.25 of an inch in width at the bases thereof.

Embodiment shown in FIGS. 12 and 13

In the cooking vessel of the embodiment shown in FIGS. 12 and 13, a stainless steel liner 101 has anchor elements comprising rough, irregularly shaped fragments or rubble pieces 113 of cast iron or steel or the like copper brazed to the bottom thereof. An aluminum layer 32 is die cast against the outer surface of the liner and around the rubble pieces 113 and an electrically insulated resistance heater 51 having a steel sheath is secured to the liner by brackets (not shown) similar to the brackets 97 shown in FIG. 8. The pieces 113 interlock with the aluminum firmly to bond the aluminum layer to the bottom of the liner, and an overhanging lip 115 forming a groove 117 bonds the sides of the layer 32 to the liner 101. Rubble pieces of at least about 1/16 of an inch in their greatest dimension have been found to be very satisfactory.

Embodiment shown in FIGS. 14, 15 and 16

In the embodiment of the invention shown in these figures, the frying pan is similar to that shown in FIG. 1 but does not include a separate anchor plate. The pan shown in FIG. 14 includes a stainless steel liner 131 having staggered rows of anchoring hooks 135 gouged or chiselled therefrom in a gang-chiselling operation. These hooks are embedded in an aluminum layer 32 which is die cast over the liner. A sheathed resistance heater 51 is also cast directly in the layer 32. The molten aluminum flows into grooves 137 formed by the chiselling operation firmly to embed the hooks 135 in the cast layer. As best shown in FIG. 16, the anchoring is enhanced by the overhanging portions 138 and 139 of the hook members 135. The hooks may be of a thickness of the order of 0.015 of an inch at the thickest portions thereof which are located at the junctures with the liner, and the liner is about 0.030 of an inch in thickness. The overhanging portions 138 and 139 and the groove portions 137 firmly lock the aluminum layer 32 to the liner 131 so as to provide a strong, durable bond.

Embodiment shown in FIGS. 17 through 21

The frying pan shown in these figures of the drawings is generally similar to that shown in FIG. 1 but different anchoring means are utilized. The pan shown in FIGS. 17 through 21 has grill-like anchoring sheet 143 welded or copper-brazed over the entire face thereof, to the bottom of a stainless steel liner 101 forming the interior of the pan. Loops 145 are provided for the purpose of interlocking the liner 101 with the aluminum layer 32. The loops 145 are formed by slitting the sheet along the sides of the loops and pressing or drawing the loops out of the plane of the sheet. The loops are generally angular in shape, have apices 146 and are stretched sufficiently far during their formation that side openings 147 are provided above the upper face of the sheet 143, as viewed in FIGS. 18 and 19, so that during the casting operation the aluminum can flow under the loops into contact with the liner 101 and fill the entire cavities under the loops. In this manner, the aluminum layer 32 is firmly locked or bonded to the sheet 143.

The sheet 143 may be copper-brazed to the bottom of liner 101 after the liner has been drawn to its desired shape from an initially flat or planar shape. However, the high heat of the copper brazing sometimes causes warpage. To avoid such warpage, the sheet 143 may be copper-brazed to the liner 101 before drawing the liner while the liner is planar, after which the liner is drawn to its desired pan shape which smooths out any warping. However, in drawing the liner 101 from a flat sheet to the desired shape of the interior of a frying pan with the sheet 143 brazed thereto at all portions thereof except the loops 145, the portions of the liner 101 facing the loops 145, which are not bonded to the sheet 143, stretch more than the surrounding portions of the liner 101. This sometimes produces a discernible pattern on the exposed or cooking face of the liner 101. To avoid both the warping and the discernible pattern, the liner 101 can be first drawn from a flat sheet to a depth of from 1/8 of an inch to 1/32 of an inch less than is desired for the final depth, and the sheet 143 then copper-brazed to the liner. The liner 101 is then drawn the remaining increment of from 1/8 of an inch to 1/32 of an inch in depth which eliminates all previous warping while the portions of the liner 101 underneath the loops 145 are not discernibly stretched by this slight drawing step.

After the liner 101 is drawn to its desired depth, which was approximately one and one-half inches in one constructed embodiment, a shallow peripheral groove 117 (FIG. 20) is drawn to form an overhanging lip 115. An excess peripheral flange portion 116 may be partially sheared away from the lip 115 at this time to facilitate subsequent removal of the excess flange portion from the lip 115. This shearing may be only partly through the metal completely around the lip 115 or it may be a complete shearing except for narrow sections remaining unsheared at spaced points around the periphery. These narrow sections permit handling of the liner 101 and pan by the flange 116 yet permit easy removal of the flange from the pan in a subsequent operation.

The liner 101 is placed between two mold halves (not shown) pressing against the peripheral excess flange portion 116 to seal the molding cavity, and molten aluminum is introduced under pressure into the mold cavity to die cast the layer 32 onto the liner 101. The molten aluminum fills the groove 117 and flows through the openings 147 (FIG. 18) so as to fill the spaces or recesses under the loops 145, and the entire molding cavity. The aluminum is allowed to cool, solidifying the aluminum layer 32 tightly to bond it to the sides and bottom of the liner 101 and sheet 143. The loops 145 and overhanging lip 115 positively interlock with the aluminum layer 32 to prevent any separation between the liner 101 and layer 32. The excess peripheral portion 116 is then removed from the pan and the pan is polished.

*Embodiment shown in FIGS. 22 and 23*

The frying pan shown in FIGS. 22 and 23 is generally similar to that shown in FIGS. 17 through 21, and includes a liner 101 provided with a pan-shaped anchor sheet 153 locking a heat conductive layer 32 of aluminum to the bottom and sides of the liner 101. The anchor sheet 153 has loops 155 forming openings 156 positively to lock the layer 32 to the sheet 153 and liner 101. Side portions 159 extend substantially half way up the sides of the liner 101 and, with an overhanging lip or rim 115 forming a groove 117, lock together the sides of the layer 32 and the liner 101.

The sheet 153 preferably is welded or copper-brazed to the liner 101 while both of these members are planar. The excess peripheral flange portion 116 is then clamped between rings 161 and 162 (FIG. 22) of a drawing mechanism and a central punch 163 is moved downwardly to draw the liner 101 and the sheet 153 into the shape of a pan. The groove 117 is then formed by a separate operation, and the layer 32 is die cast into interlocked and bonded engagement with the liner 101 and the anchor sheet 153, with a resistance heater 51 being embedded in the layer 32.

The exterior of each of the liners 31, 101 and 131 may be sand blasted prior to the application of aluminum thereto to increase the interlocking effect and also increase the area of contact between the aluminum and the liner elements. Also after the sand blasting, a thin layer of aluminum may be flame sprayed onto the liner by known methods, after which the thick aluminum layer is die cast thereon.

The above-described cooking vessels have thin, hard, scratch resistant, non-corrosive liners to which outer shells of excellent thermal conductivity supply heat uniformly to the bottoms of the vessels. The liners are locked securely to the outer layers or shells in intimate contact therewith so that the heat transfer characteristics therebetween are high. The cooking vessels are rugged and durable while inexpensive in construction and fabrication.

While there have been illustrated and described several embodiments of the present invention, various changes and modifications will occur to those skilled in the art, and it is intended in the appended claims to cover all such changes and modifications as fall within the true spirit and scope of the present invention.

What is claimed as new and desired to be secured by Letters Patent of the United States is:

1. In a heating plate, a sheet of stainless steel, a plurality of sheet metal brackets welded to said sheet and having portions extending away from said sheet provided with openings, a sheathed resistance heating element extending through said openings and interlocked with said brackets in a position spaced from said sheet, and a layer of metal of high heat conductivity in intimate engagement with said sheet and filling the space between said sheet and said heating element whereby said brackets and heating element serve as anchoring structure for locking said layer to said sheet.

2. A cooking vessel comprising a thin liner formed in the shape of a cooking vessel having a bottom and sides, a heat distributing layer of aluminum having an inner surface conforming to the outer surface of said liner with said layer substantially extending to the top of the sides of said liner, locking means separate and independent of said liner for both said bottom and said sides of said liner and secured thereto, said locking means being imbedded in said heat distributing layer thereby to bond the adjacent surfaces of said liner and said layer together to form a unitary vessel, and an electric heating element embedded in said layer in proximity to said liner but spaced therefrom, the space between said heating element and said liner being filled by said layer.

3. A cooking vessel as set forth in claim 2 wherein said liner includes an outwardly extending flange disposed at the top edge thereof, said locking means including means secured to said flange and embedded in said layer.

References Cited in the file of this patent
UNITED STATES PATENTS

| | | |
|---|---|---|
| 341,434 | Russell | May 4, 1886 |
| 1,886,396 | Hainlen | Nov. 8, 1932 |
| 1,960,042 | Andrus | May 22, 1934 |

(Other references on following page)

UNITED STATES PATENTS

| | | |
|---|---|---|
| 2,108,409 | Peron | Feb. 15, 1938 |
| 2,119,668 | Dupre | June 7, 1938 |
| 2,285,583 | Jennings et al. | June 9, 1942 |
| 2,357,578 | Brownback | Sept. 5, 1944 |
| 2,579,898 | Brucker | Dec. 25, 1951 |
| 2,604,227 | Carriker | July 22, 1952 |
| 2,611,070 | Chandler | Sept. 16, 1952 |
| 2,744,995 | Jepson | May 8, 1956 |
| 2,807,700 | Jepson | Sept. 24, 1957 |
| 2,841,137 | Chase | July 1, 1958 |

FOREIGN PATENTS

| | | |
|---|---|---|
| 169,767 | Switzerland | Oct. 1, 1934 |
| 40,099 | Netherland | Feb. 15, 1937 |
| 359,711 | Italy | June 3, 1938 |
| 109,512 | Australia | Jan. 8, 1940 |
| 540,868 | Great Britain | Nov. 3, 1941 |
| 218,334 | Switzerland | Mar. 16, 1942 |
| 556,065 | Great Britain | July 21, 1943 |
| 778,224 | Great Britain | July 3, 1957 |